United States Patent Office 3,396,124
Patented Aug. 6, 1968

3,396,124
CATALYST FOR LOW TEMPERATURE CONVERSION OF HYDROCARBONS TO HYDROGEN AND METHANE
William F. Taylor, Scotch Plains, and John H. Sinfelt, Berkeley Heights, N.J., assignors to Esso Research and Engineering Company, a corporation of Delaware
No Drawing. Filed May 7, 1964, Ser. No. 365,803
5 Claims. (Cl. 252—465)

This invention is concerned with a catalyst of improved high activity for the reaction of steam with light hydrocarbons, e.g., $C_2$ to $C_{10}$ hydrocarbons, at low reaction temperatures in the range of 600° to 925° F. to produce a gaseous product rich in methane at high conversion levels and richer in hydrogen at lower conversion levels. The catalyst may contain 10 to 60 wt. percent nickel together with a zinc and chromium promoter interspersed with alumina obtained by the coprecipitation technique.

The zinc and chromium promoter gives improved results even when used with other promoters, such as barium and others described in application Ser. No. 317,799, filed Oct. 21, 1963, by William F. Taylor and John H. Sinfelt.

The zinc and chromium promoted nickel-alumina catalyst with relatively low nickel content, 10 to 30 wt. percent Ni, has a surprisingly high activity since the interspersed nickel-alumina catalyst with only zinc as a promoter or only the chromia as the promoter, showed a much lower activity.

The use of the zinc and chromium promoter has been found to be particularly advantageous in the reaction of $C_5$ to $C_{10}$ hydrocarbons, including light naphthas, which are predominantly paraffinic and which may include naphthenes and aromatics, at moderate conversion levels with steam in the presence of a low nickel-content catalyst to produce a gaseous product richer in hydrogen than methane. The optimum moderate conversion levels shown by some of the tests are in the range of 10 to 35%.

In the low-temperature reaction of the light hydrocarbons with steam to form hydrogen and methane, the hydrocarbon feed is preheated and mixed with steam to obtain a reaction mixture which enters a bed of the catalyst at temperatures in the range of 600° to 800° F. for most of the time to avoid rapid deactivation of the catalyst which tends to occur as the temperature approaches and exceeds 925° F. The hydrocarbon feed-steam mixture may contain from 1 to 4 lbs. of steam per lb. of hydrocarbon feed, preferably 1.5 to 3 lbs. of steam per lb. of hydrocarbon feed. The pressure in the reaction zone is maintained in the range of 150 to 1500 p.s.i.g.

The preferred light naphtha hydrocarbon feeds are of low sulfur content and principally contain $C_5$ to $C_6$ paraffins, although they may contain other hydrocarbons including ethane, propane and butane, which also undergo reaction to form hydrogen and methane. Hydrofined virgin naphtha fractions containing less than 3 p.p.m. sulfur have been used for testing to minimize poisoning of the catalyst by sulfur. The poisoning of the catalyst by sulfur is the temporary kind, because by using feeds low in sulfur content, sulfur is removed from the catalyst. Representative naphtha feeds, which are known as technical $C_5/C_6$ fractions and which have been found suitable, contain butanes, 17 to 64% n-pentane and isopentane, 12 to 58% hexanes, and smaller amounts of heptanes, naphthenes and benzene.

The mass space velocity, which is defined as the weight of hydrocarbon feed passed through the catalyst bed in terms of lbs. of hydrocarbon per lb. of catalyst per hour (w./w./hr.), is suitably in the range of 1 to 20 w./w./hr.

The interspersing or coprecipitation technique involves coprecipitation of nickel with aluminum as hydroxides, carbonates, or basic carbonates from the aqueous solutions of nickel and aluminum nitrate salts by $NH_4HCO_3$ at temperatures of about 32° to 212° F., drying of the precipitates at a temperature of 200° to 400° F., calcining of the dried precipitates in air at 600° to 925° F., and reduction or activation of the calcined precipitates by hydrogen at 600° to 1000° F. The promoters may be added as decomposable metal salts to solutions in which the coprecipitation takes place or may be added to the wet precipitate prior to the drying. The decomposable compounds are preferably hydroxides, carbonates, basic carbonates or nitrates. The promoter metal compounds may be admixed to have the final catalyst contain about 5 to 25 wt. percent of the promoter calculated as metals. The final catalyst granules or particles after calcining and after activation are preferably of 1 to 5 mm. particle size or these may be compressed into larger pellets or extruded for use.

In the formation of the promoted interspersed nickel-alumina catalyst, the zinc and the chromium are considered to undergo reactions during the calcination to form oxides, but may be also present in the form of other compounds such as carbonates. Other promoters may be selected from the group consisting of Ba, La, Ce, Sr, Cs, K, Y, Cu and Fe. These promoters, calculated as metals, are generally used in proportions of 1 to 10 wt. percent of the catalyst. It is also possible for the copper and iron promoters to undergo reaction with the chromium oxide. As it is difficult to determine the exact nature of the promoter compounds the proportion of the promoters is conventionally stated in terms of the metal present in the catalyst. The improved activity obtained with the zinc and chromium promoted $Ni-Al_2O_3$ catalyst is demonstrated in the following examples:

Example 1.—Barium promoted nickel-alumina catalyst without zinc and chromium by interspersion technique Add 310 g. of $Ni(No_3)_2 \cdot 6H_2O$ and 1390 g. of $Al(NO_3)_3 \cdot 9H_2O$ to 3 liters of deionized water and bring the solution to 120° F. Then add 1390 g. of $NH_4HCO_3$ to the solution while stirring over an approximate 1-hour period while holding the temperature at 120° F. After the $NH_4HCO_3$ addition is completed, continue to stir the slurry an additional hour at 120° F. Then remove excess water, leaving a paste. Then dissolve 23.8 g. $Ba(NO_3)_2$ in 200 cc. of deionized water and add to the catalyst paste and mix well. The catalyst is then dried overnight at 230° F. and calcined for 4 hours at 750° F. in air. The calcined catalyst analyzed 19.4 wt. percent nickel and 8.0 wt. percent barium and had a total surface area measured by nitrogen adsorption of 173 m.$^2$/g. The catalyst had a nickel surface area as measured by the $H_2$ chemisorption technique of 12.9 m.$^2$/g. after reduction in $H_2$ at 1000° F.

Example 2.—Tests of $Ba-Ni-Al_2O_3$ catalysts for $H_2$ production

The catalyst prepared in Example 1 was charged to a pilot plant and reduced with $H_2$ for 10 hours at 900° F. The catalyst was tested using 95% n-hexane at 700 p.s.i.g. and 900° F. at a space velocity of 5.6 lbs. of hexane per lb. of catalyst per hour, using 2 lbs. of $H_2O$ per lb. of hexane. The activity of the catalyst was measured as wt. percent hydrocarbon conversion. The selectivity at each conversion level is shown in the following table.

TABLE I

| Percent conversion | 47.0 | 23.8 | 18.2 | 15.3 |
|---|---|---|---|---|
| $H_2/CH_4$ mole ratio | 1.34 | 3.66 | 7.0 | 10.1 |

Example 3.—Zinc-chromium promoted nickel-alumina catalyst by interspersion technique To 3 liters of deionized water was added 310 g. $Ni(NO_3)_2 \cdot 6H_2O$, 940 g. $Al(NO_3)_3 \cdot 9H_2O$, 138 g.

$Cr(NO_3)_2 \cdot 9H_2O$ and 102 g. $Zn(NO_3)_2 \cdot 6H_2O$, and $Cr(NO_3)_2 \cdot 9H_2O$ and 102 g. $Zn(NO_3)_2 \cdot 6H_2O$, and the solution brought to 120° F. Then 1150 g. of $NH_4HCO_3$ was added to the solution over an approximate 1-hour period while maintaining the slurry at 120° F. while stirring. After the precipitation was completed, the slurry was stirred an additional 1 hour at 120° F. and excess water removed. The resultant catalyst was dried overnight at 230° F. and then calcined for 4 hours at 750° F. The catalyst analyzed 21.3 wt. percent nickel, 6.5 wt. percent chromium and 8.6 wt. percent zinc.

In the calcined catalyst the zinc and chromium may be present in an oxidized form, i.e., as the chromate, $ZnCrO_4$, and possibly also as the chromite or the dichromate. After activation by reduction with $H_2$ the zinc and chromium oxide may be partially reduced along with part of the nickel oxide which is reduced.

Example 4.—Tests of Zn-Cr promoted Ni-$Al_2O_3$ catalyst

The catalyst prepared in Example 3 was charged to a pilot plant, reduced with $H_2$ for 10 hours at 900° F. The catalyst was tested using 95% n-hexane at 700 p.s.i.g. and 900° F. using 2 lbs. $H_2O$/lb. hydrocarbon feed at mass space velocities of 5.6 to 8.1 w./w./hr.

TABLE II.—TESTS OF CONVERSION AND SELECTIVITY
[Catalyst: Zn-Cr Promoted Ni-$Al_2O_3$]

| Hours on Feed | Mass Space Velocity, w./w./hr. | Percent Hydrocarbon Conversion | $H_2/CH_4$ Mole Ratio |
|---|---|---|---|
| 4-12 | 5.6 | 94.3 | 0.208 |
| 20-28 | 5.6 | 94.1 | 0.236 |
| 36-44 | 8.1 | 40.7 | 1.03 |
| 44-52 | 7.6 | 33.8 | 1.66 |
| 52-60 | 5.0 | 39.6 | 1.52 |
| 60-68 | 5.6 | 33.4 | 1.45 |

It can be seen by comparison of the data in Table II with the data in Table I that the low nickel content catalyst with zinc-chromium promoter is less selective to $H_2$ than the barium promoted low nickel content catalyst prepared as described in Example 1. It has been demonstrated, however, that the zinc-chromium promoter has a higher activity for the same time on feed than the barium promoted catalyst or a commercial Ni-$Al_2O_3$ catalyst of similar nickel content and much higher selectivity toward formation of hydrogen than commercial Ni-$Al_2O_3$ catalysts of similar nickel content for a given conversion level as shown in the following table.

TABLE III

Comparison of Selectivities and Activities of Catalysts Conditions:
Hydrocarbon Feed, 95% n-hexane
Mass Space Velocity, 5.6 w./w./hr.
2 lbs. $H_2O$/lb. Hydrocarbon
Inlet Temperature, 900° F.

| Catalyst | Time on Feed, Hours | Percent Conversion | $H_2/CH_4$ Mole Ratio |
|---|---|---|---|
| Ba-Ni-$Al_2O_3$ (Example 1) | 52-60 | 15.3 | 10.1 |
| $ZnCrO_4$-Ni-$Al_2O_3$ (Example 3) | 60-68 | 33.4 | 1.45 |
| 25% Ni-$Al_2O_3$ (Commercial) | 18-20 | 33.0 | 1.0 |

Example 5.—Zinc-chromium-barium promoted nickel on alumina catalyst

To 3 liters of deionized water was added 310 g. $Ni(NO_3)_2 \cdot 6H_2O$, 940 g. $Al(NO_3)_3 \cdot 9H_2O$, 138 g. $Cr(NO_3)_3 \cdot 9H_2O$ and 102 g. $Zn(NO_3)_2 \cdot 6H_2O$ and the solution brought to 120° F. Then 1150 g. of $NH_4HCO_3$ was added to the solution over an approximate 1-hour period while maintaining the slurry at 120° F. while stirring. After the precipitation was completed, the slurry was stirred an addtional 1 hour at 120° F., and excess water removed. Then 23.6 g. $Ba(NO_3)_2$ dissolved in a little deionized water was added and stirred well. The resultant catalyst was dried overnight at 230° F. and then calcined for 4 hours at 750° F. The resultant catalyst contained 20.4 wt. percent nickel, 6.2% chromium, 8.2% zinc and 4.3% barium. After reduction with $H_2$ for 16 hours at 700° F., it had a metal area as measured by $H_2$ chemisorption of 9.4 m.²/g. catalyst, and after reduction for 16 hours at 900° F., a metal area of 11.1 m.²/g. The total surface area after calcination as measured by nitrogen adsorption was 158 m.²/g.

Example 6.—Tests on Zn-Cr-Ba promoted Ni on $Al_2O_3$ catalyst

The catalyst prepared in Example 5 was charged to a pilot plant, reduced with $H_2$ for 10 hours at 900° F. and then tested on a variety of feeds at 900° F., 700 p.s.i.g. and 2 lbs. $H_2O$/lb. hydrocarbon feed at space velocities varying from 5.6 to 11.2 w./w./hr. (lbs. hydrocarbon per lb. catalyst per hour).

TABLE IV

| Hours on Feed | Feed | W./W./Hr. | Percent Hydrocarbon Conversion | $H_2/CH_4$ Mole Ratio |
|---|---|---|---|---|
| 4-12 | n-Hexane | 5.6 | 90.7 | 0.218 |
| 44-52 | do | 11.2 | 45.9 | 1.05 |
| 68-76 | do | 11.2 | 33.7 | 1.32 |
| 99-107 | 50% n-hexane, 50% benzene. | 6.0 | 26.3 | 2.56 |
| 107-115 | do | 6.5 | 27.0 | 2.60 |
| 151-159 | n-Hexane | 5.7 | 22.2 | 3.36 |
| 203-211 | 50% n-hexane, 50% cyclohexane. | 5.6 | 21.6 | 5.86 |
| 215-223 | n-Hexane | 5.6 | 18.2 | 5.14 |
| 223-231 | do | 5.6 | 20.3 | 6.0 |

A comparison of the data obtained with the triply promoted catalyst containing Zn, Cr, and Ba, as promoters, compared to the catalyst described in Example 2 shows this catalyst to be more active after 200 hours on feed than a Ba-Ni-$Al_2O_3$ catalyst without zinc and chromium after only 60 hours. The barium-zinc-chromium promoted catalyst is as active as the Zn-Cr promoted catalyst and is also able to give good conversion of feeds containing high quantities of aromatics and naphthenes without the sharp drop in hydrocarbon conversion level that had been found with other nickel catalysts. Selectivity to $H_2$ is also good when using a high aromatic or naphthene-containing feed.

Example 7.—Comparison of nickel-alumina catalysts singly promoted with zinc or chromium A series of catalysts was prepared to compare the effect of singly promoting a nickel-alumina catalyst with zinc or chromium as follows. Catalysts A and B were prepared by adding 750 g. $Ni(NO_3)_2 \cdot 6H_2O$ and 740 g. $Al(NO_3)_3 \cdot 9H_2O$ to 3 liters of deionized water. Then 1040 g. of $NH_4HCO_3$ was added over an approximate 1-hour period while holding the stirred slurry between 32° and 120° F. The resultant catalyst was then filtered to remove part of the excess water. To catalyst A was added no promoter. To catalyst B was added 20.6 g. $Zn(NO_3)_2 \cdot 6H_2O$. Catalyst C was prepared using 750 g. $Ni(NO_3)_2 \cdot 6H_2O$, 648 g. $Al(NO_3)_3 \cdot 9H_2O$ and 96 g. $Cr(NO_3)_3 \cdot 9H_2O$. The resultant catalysts were dried overnight at 350° F. and then calcined in air for four hours at 750° F.

The activity of the catalysts was tested in a series of pilot plant runs after pre-reduction with $H_2$ for 10 hours at 750° F. Test conditions were 5.6 w./w./hr. of 95% n-hexane, 700° F., and 500 p.s.i.g., using 2 lbs. $H_2O$/lb. hydrocarbon feed. Activity was measured for a standard charge of catalyst as s.c.f./hr. of product gas produced.

TABLE V

| | Promoter | Activity at hour 25 on feed |
|---|---|---|
| Catalyst: | | |
| A | None | 10 |
| B | Zinc | 4.7 |
| C | Chromium | 3.2 |

It can be seen that the use of added zinc or chromium alone resulted in a catalyst with less activity than an unpromoted catalyst. Other tests have shown that the use of an effective promoter increases the activity of an unpromoted nickel alumina catalyst.

We claim:

1. A catalyst having improved activity for the reaction of steam with hydrocarbons at low temperatures in the range of 600° F. to 925° F. to produce a gaseous product containing principally methane and hydrogen prepared by coprecipitating from solutions nickel and alumina and incorporating in the coprecipitate a promoter containing zinc and chromium, said catalyst containing 10 to 60 wt. percent nickel and 10 to 30 wt. percent zinc and chromium, calculated as the metals.

2. The catalyst of claim 1 wherein said zinc and chromium are incorporated in the catalyst by simultaneous coprecipitation with said nickel and alumina.

3. The catalyst of claim 1 wherein said nickel is present in an amount ranging from 10 to 30 wt. percent.

4. The catalyst of claim 1 wherein a second promoter selected from the group consisting of Ba, La, Ce, Sr, Cs, K, Y, Cu, and Fe is incorporated within the catalyst.

5. The catalyst of claim 4 wherein said second promoter is present in an amount ranging from 1 to 10%.

References Cited

UNITED STATES PATENTS

| | | | |
|---|---|---|---|
| 1,673,032 | 6/1928 | Williams | 23—212 |
| 1,899,184 | 2/1933 | De Simó | 23—212 |
| 3,119,667 | 1/1964 | McMahon | 23—212 |
| 3,271,325 | 9/1966 | Davies et al. | 252—466 |

FOREIGN PATENTS

| | | |
|---|---|---|
| 820,257 | 9/1959 | Great Britain. |

DANIEL E. WYMAN, *Primary Examiner.*

C. F. DEES, *Assistant Examiner.*